US011819902B2

(12) United States Patent
Davies et al.

(10) Patent No.: US 11,819,902 B2
(45) Date of Patent: Nov. 21, 2023

(54) EXPANSION TOOL

(71) Applicant: MILWAUKEE ELECTRIC TOOL CORPORATION, Brookfield, WI (US)

(72) Inventors: Peter J. Davies, Milwaukee, WI (US); Peng Dai, Dongguan (CN); Zhi Bin Li, Dongguan (CN); Jing Jing Cai, Dongguan (CN); Jian Wei Li, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 259 days.

(21) Appl. No.: 17/187,265

(22) Filed: Feb. 26, 2021

(65) Prior Publication Data

US 2022/0168793 A1    Jun. 2, 2022

(30) Foreign Application Priority Data

Nov. 27, 2020 (CN) .......................... 202022807044.9

(51) Int. Cl.
*B21D 39/20* (2006.01)
*B21D 39/16* (2006.01)
*B21D 41/02* (2006.01)

(52) U.S. Cl.
CPC ............. *B21D 39/20* (2013.01); *B21D 39/16* (2013.01); *B21D 41/028* (2013.01)

(58) Field of Classification Search
CPC ...... B21D 39/16; B21D 39/20; B21D 41/028; B29C 57/045
See application file for complete search history.

(56) References Cited

U.S. PATENT DOCUMENTS 1,404,819 A    1/1922   Wiedeke
1,752,408 A    4/1930   Zein
(Continued)

FOREIGN PATENT DOCUMENTS

CN     201346602 Y    11/2009
CN     204018564 U    12/2014
(Continued)

OTHER PUBLICATIONS

European Patent Office Extended Search Report for Application No. 21209255.5 dated Apr. 11, 2022 (8 pages).

*Primary Examiner* — Kyle A Cook
(74) *Attorney, Agent, or Firm* — Michael Best & Friedrich LLP

(57) ABSTRACT

An expansion tool includes a housing, a collar rotatably coupled to the housing, a plurality of jaws coupled for co-rotation with the collar, a mandrel movable relative to the housing between a retracted position and an extended position to expand the jaws, and a drive mechanism including a rotatable cam. Rotation of the cam moves the mandrel between the retracted position and the extended position. The expansion tool further includes an indexing gear configured to incrementally receive torque from the drive mechanism such that continuous rotation of the drive mechanism incrementally rotates the indexing gear, and a clutch assembly including a clutch gear meshed with the indexing gear, a clutch cover surrounding the clutch gear, and a plurality of rolling elements disposed between the clutch gear and the clutch cover. The clutch cover is drivably coupled to the collar such that rotation of the clutch cover rotates the collar.

20 Claims, 8 Drawing Sheets

(56) References Cited

U.S. PATENT DOCUMENTS

| | | |
|---|---|---|
| 2,085,447 A | 6/1937 | Plaine |
| 2,725,918 A | 12/1955 | Deshler |
| 2,737,996 A | 3/1956 | Toth |
| 2,835,307 A | 5/1958 | Jorgensen |
| 2,999,529 A | 11/1958 | Rast |
| 3,550,424 A | 12/1970 | Rast |
| 3,677,684 A | 7/1972 | Platz |
| 3,753,635 A | 8/1973 | Barnett |
| 3,857,666 A | 12/1974 | Barnett |
| 3,861,847 A | 1/1975 | Barnett |
| 3,888,102 A | 6/1975 | Nigido |
| 3,940,227 A | 2/1976 | Strasser |
| 3,947,950 A | 4/1976 | Adams |
| 4,034,591 A | 7/1977 | Rothenberger |
| 4,107,249 A | 8/1978 | Murai et al. |
| 4,144,735 A | 3/1979 | Rothenberger |
| 4,154,083 A | 5/1979 | Rothenberger |
| 4,397,173 A | 8/1983 | Eftefield et al. |
| 4,425,783 A | 1/1984 | Rast |
| 4,603,890 A | 8/1986 | Huppee |
| 4,733,551 A | 3/1988 | Bryant et al. |
| 4,735,078 A | 4/1988 | Wesebaum |
| 4,890,472 A | 1/1990 | Rothenberger |
| 5,046,349 A | 9/1991 | Velte |
| 5,090,226 A | 2/1992 | Takeoka et al. |
| 5,090,230 A | 2/1992 | Koskinen |
| 5,135,268 A | 8/1992 | McNaughton et al. |
| 5,243,845 A | 9/1993 | Velte |
| 5,261,709 A | 11/1993 | McNaughton et al. |
| 5,704,244 A | 1/1998 | Halasz et al. |
| 5,727,414 A | 3/1998 | Halasz et al. |
| 5,744,085 A | 4/1998 | Soberg |
| 5,879,033 A | 3/1999 | Hansel et al. |
| 5,943,891 A | 8/1999 | Takagi et al. |
| 6,199,915 B1 | 3/2001 | Becker |
| 6,783,160 B2 | 8/2004 | Rowley |
| 6,862,766 B2 | 3/2005 | Geurts |
| 7,014,214 B2 | 3/2006 | Kaneko |
| 7,065,995 B2 | 6/2006 | Frenken |
| 7,128,560 B2 | 10/2006 | Tandart |
| 7,325,436 B2 | 2/2008 | Cheng |
| 7,490,499 B2 | 2/2009 | Suzuki et al. |
| 7,516,990 B2 | 4/2009 | Jamison et al. |
| 7,681,636 B2 | 3/2010 | Roggeband et al. |
| 7,735,877 B2 | 6/2010 | Ito et al. |
| 7,806,213 B2 | 10/2010 | Inoue et al. |
| 7,922,475 B2 | 4/2011 | Gueit |
| 8,302,448 B2 | 11/2012 | Woelcken et al. |
| 8,303,295 B2 | 11/2012 | Gueit |
| 8,371,409 B2 | 2/2013 | Inoue et al. |
| 8,511,133 B1 | 8/2013 | Chen |
| 8,517,715 B2 | 8/2013 | Thorson et al. |
| 8,534,711 B2 | 9/2013 | Inoue et al. |
| 8,562,331 B2 | 10/2013 | Schramm et al. |
| 8,763,439 B2 | 7/2014 | Thorson et al. |
| 9,027,966 B2 | 5/2015 | Altmann et al. |
| 9,089,889 B2 | 7/2015 | Kohnen |
| 9,248,617 B2 | 2/2016 | Lundequist et al. |
| 9,808,852 B2 | 11/2017 | Frenken |
| 9,862,137 B2 | 1/2018 | Dickert et al. |
| 9,914,260 B2 | 3/2018 | Ellice |
| 9,975,289 B2 | 5/2018 | Li et al. |
| 9,993,961 B2 | 6/2018 | Dickert et al. |
| 10,000,007 B2 | 6/2018 | Dickert et al. |
| 10,195,783 B2 | 2/2019 | Dickert et al. |
| 10,406,586 B2 | 9/2019 | Frenken |
| 2005/0093298 A1 | 5/2005 | Takayanagi |
| 2006/0201228 A1 | 9/2006 | Rothenberger |
| 2007/0057393 A1 | 3/2007 | Hartmann et al. |
| 2008/0122222 A1 | 5/2008 | Sheppard |
| 2008/0160130 A1 | 7/2008 | Gueit |
| 2011/0239674 A1 | 10/2011 | Defilippi |
| 2018/0029286 A1 | 2/2018 | Li et al. |
| 2018/0128323 A1* | 5/2018 | Carlson .................. F16D 23/12 |
| 2019/0351605 A1 | 11/2019 | Trickle |
| 2020/0261958 A1 | 8/2020 | Davies |
| 2020/0261959 A1 | 8/2020 | Wekwert et al. |
| 2021/0254773 A1 | 8/2021 | Adelman et al. |

FOREIGN PATENT DOCUMENTS

| | | |
|---|---|---|
| CN | 107838304 A | 3/2018 |
| CN | 207308769 U | 5/2018 |
| DE | 497609 C | 5/1930 |
| DE | 2800079 A1 | 7/1978 |
| DE | 3439522 A1 | 8/1985 |
| DE | 4003994 A1 | 8/1991 |
| DE | 4005474 A1 | 9/1991 |
| DE | 19730054 C1 | 3/1999 |
| DE | 19924695 A1 | 11/2000 |
| DE | 19963885 C1 | 5/2001 |
| DE | 10063517 A1 | 7/2002 |
| DE | 20301139 U1 | 6/2004 |
| DE | 102005033482 A1 | 1/2007 |
| DE | 102006015368 A1 | 10/2007 |
| DE | 202008002265 U1 | 4/2008 |
| DE | 202008002266 U1 | 4/2008 |
| DE | 102007053518 A1 | 5/2009 |
| DE | 102008061441 A1 | 7/2009 |
| DE | 102008064320 A1 | 6/2010 |
| DE | 102013208330 A1 | 11/2014 |
| EP | 234283 A1 | 9/1987 |
| EP | 0397570 A1 | 11/1990 |
| EP | 0462719 A2 | 12/1991 |
| EP | 0567742 A2 | 11/1993 |
| EP | 0718057 A2 | 6/1996 |
| EP | 0878287 A1 | 11/1998 |
| EP | 0967427 A2 | 12/1999 |
| EP | 1118401 A1 | 7/2001 |
| EP | 1278001 A2 | 1/2003 |
| EP | 1930640 A1 | 6/2008 |
| EP | 2090384 A2 | 8/2009 |
| EP | 3520923 A1 | 8/2019 |
| FR | 2451235 A1 | 10/1980 |
| FR | 2645052 A1 | 10/1990 |
| GB | 1485098 A | 9/1977 |
| GB | 1524149 A | 9/1978 |
| WO | 8800503 A1 | 1/1988 |
| WO | 1996020798 A1 | 7/1996 |
| WO | 1996040457 A2 | 12/1996 |
| WO | 0189736 A1 | 11/2001 |

* cited by examiner

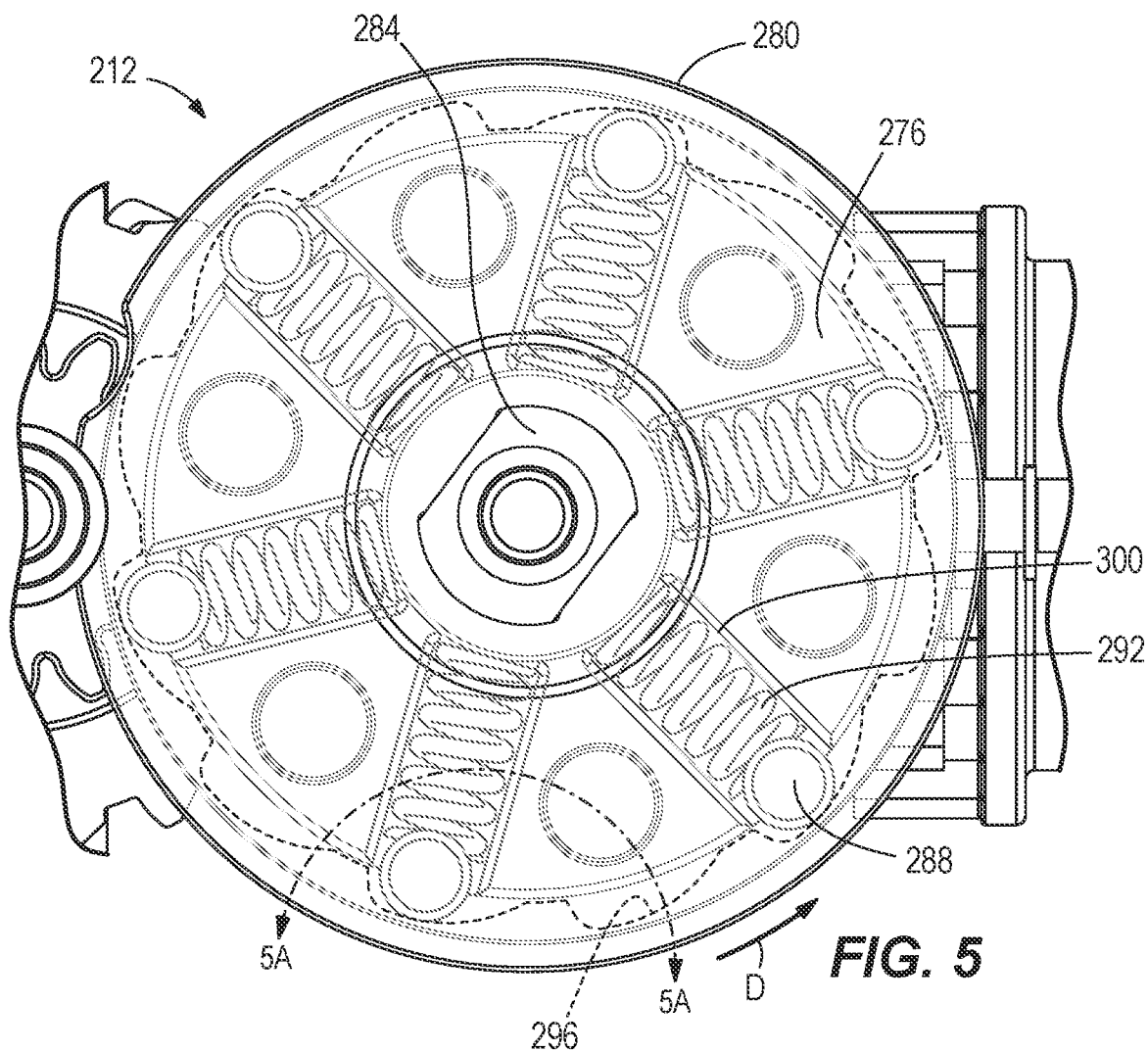
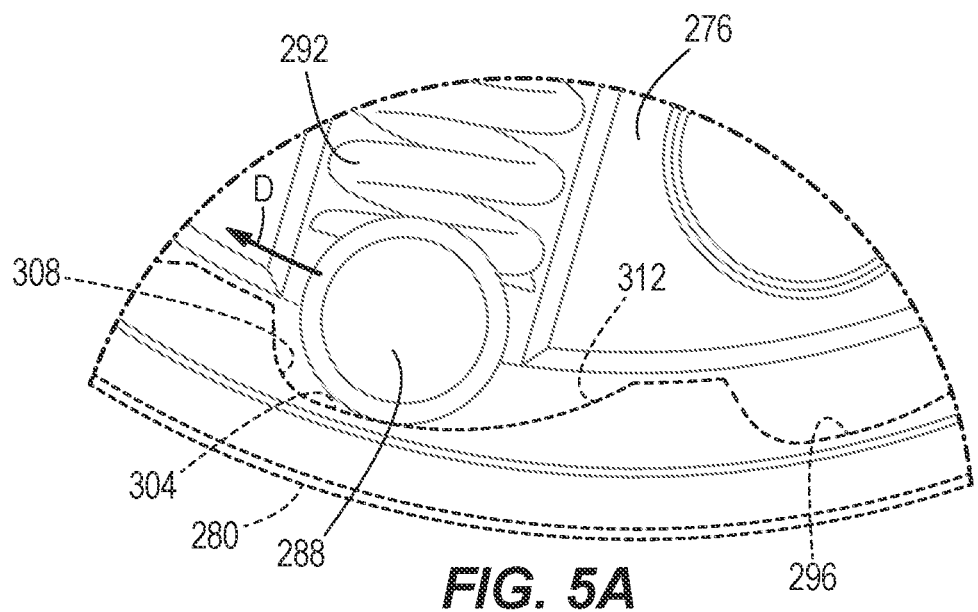

EXPANSION TOOL

CROSS-REFERENCE TO RELATED APPLICATIONS

The present application claims priority to Chinese Utility Model Application No. 202022807044.9, filed Nov. 27, 2020, the entire content of which is incorporated herein by reference.

FIELD OF THE INVENTION

The present disclosure relates to pipe and tubing expansion tools. More particularly, the present disclosure relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

SUMMARY OF THE INVENTION

The present invention provides, in a first aspect, an expansion tool including a housing, a collar rotatably coupled to the housing, a plurality of jaws coupled for co-rotation with the collar, a mandrel movable relative to the housing between a retracted position and an extended position, the mandrel engageable with the jaws to expand the jaws in response to movement of the mandrel to the extended position, and a drive mechanism including a rotatable cam. Rotation of the cam moves the mandrel between the retracted position and the extended position. The expansion tool further includes an indexing gear configured to incrementally receive torque from the drive mechanism such that continuous rotation of the drive mechanism incrementally rotates the indexing gear, and a clutch assembly including a clutch gear meshed with the indexing gear, a clutch cover surrounding the clutch gear, and a plurality of rolling elements disposed between the clutch gear and the clutch cover. The rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold. The clutch cover is drivably coupled to the collar such that rotation of the clutch cover rotates the collar.

Optionally, the clutch assembly further includes a clutch shaft coupled for co-rotation with the collar. The clutch shaft may include a bevel gear.

Optionally, the expansion tool further includes an intermediate gear assembly disposed between the bevel gear and the collar to transmit torque from the bevel gear to the collar.

Optionally, the drive mechanism, the indexing gear, the clutch gear, and the clutch cover are rotatable about parallel axes.

Optionally, the drive mechanism includes a planetary transmission, and the planetary transmission includes a carrier drivably coupled to the cam such that the cam co-rotates with the carrier.

Optionally, the carrier includes a projection engageable with the indexing gear to incrementally rotate the indexing gear.

Optionally, the clutch assembly includes a plurality of clutch springs configured to bias the plurality of rolling elements into engagement with the clutch cover.

The present invention provides, in a second aspect, an expansion tool including a housing, a collar rotatably coupled to the housing, a plurality of jaws coupled for co-rotation with the collar, a mandrel movable relative to the housing between a retracted position and an extended position, the mandrel engageable with the jaws to expand the jaws in response to movement of the mandrel to the extended position, and a drive mechanism including a rotatable cam and a planetary transmission including a carrier drivably coupled to the cam such that the cam co-rotates with the carrier. The carrier includes a first projection and a second projection, and rotation of the cam moves the mandrel between the retracted position and the extended position. The expansion tool further includes a locking assembly including an actuator engageable with the first projection such that the first projection is configured to move the actuator from a locked position to an unlocked position once per revolution of the carrier, and an indexing gear engageable with the second projection such that the second projection is configured to incrementally rotate the indexing gear once per revolution of the carrier. The indexing gear is drivably coupled to the collar such that rotation of the indexing gear rotates the collar, the locking assembly inhibits rotation of the indexing gear when the actuator is in the locked position, and the locking assembly permits rotation of the indexing gear when the actuator is in the unlocked position.

Optionally, the first projection is configured to engage the actuator to move the actuator from the locked position toward the unlocked position prior to the second projection engaging the indexing gear.

Optionally, the expansion tool further includes a clutch assembly disposed between the indexing gear and the collar.

Optionally, the clutch assembly includes a clutch gear meshed with the indexing gear, a clutch cover surrounding the clutch gear, and a plurality of rolling elements disposed between the clutch gear and the clutch cover.

Optionally, the rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold.

Optionally, the clutch cover is drivably coupled to the collar such that rotation of the clutch cover rotates the collar.

The present invention provides, in a third aspect, an expansion tool including a housing, a collar rotatably coupled to the housing, a plurality of jaws coupled for co-rotation with the collar, and a mandrel movable relative to the housing between a retracted position and an extended position, the mandrel engageable with the jaws to expand the jaws in response to movement of the mandrel to the extended position. The expansion tool also includes a drive mechanism operable to move the mandrel between the retracted position and the extended position. The drive mechanism includes a rotatable output member. The expansion tool also includes a locking assembly with an actuator configured to move from a locked position to an unlocked position once per revolution of the output member and an indexing gear configured to incrementally rotate once per revolution of the output member. The indexing gear is drivably coupled to the collar such that rotation of the indexing gear rotates the collar, the locking assembly inhibits rotation of the indexing gear when the actuator is in the locked position, and the locking assembly permits rotation of the indexing gear when the actuator is in the unlocked position.

Optionally, the expansion tool further includes a clutch assembly disposed between the indexing gear and the collar.

Optionally, the clutch assembly includes a clutch gear meshed with the indexing gear, a clutch cover surrounding the clutch gear, and a plurality of rolling elements disposed between the clutch gear and the clutch cover.

Optionally, the rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold.

Optionally, the clutch cover is drivably coupled to the collar such that rotation of the clutch cover rotates the collar.

Optionally, the expansion tool further includes an electric motor configured to provide a rotational input to the drive mechanism.

Optionally, the expansion tool further includes a battery removably coupled to the housing, the battery configured to provide power to the electric motor.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example only, with reference to the accompanying drawings in which:

FIG. 5 is a bottom view illustrating a clutch assembly of the automatic jaw rotation mechanism of FIG. 3.

FIG. 5A is an enlarged view of a section of the clutch assembly of FIG. 5 taken from an area defined by line 5A-5A in FIG. 5.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
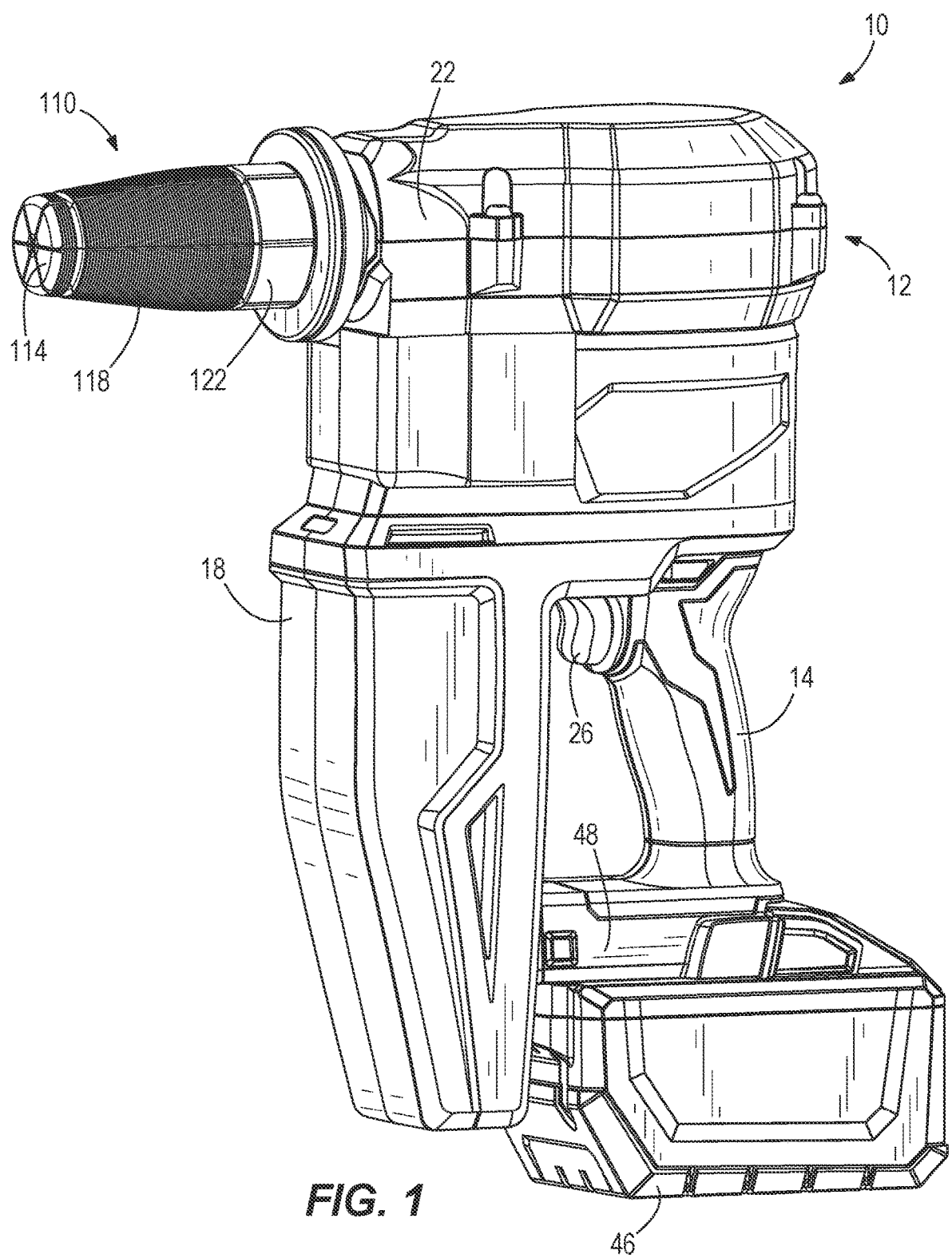
FIG. 1 is a perspective view of an expansion tool according to an embodiment of the present disclosure.

FIG. 1 illustrates an expansion tool 10 usable to expand PEX tubing prior to inserting a fitting. The expansion tool 10 includes a housing 12 with a handle 14 configured to be gripped by a user during operation of the expansion tool 10. The housing 12 includes a motor housing portion 18 and a drive housing portion 22. An actuator 26 (e.g., a trigger) for operating the expansion tool 10 is positioned on the handle 14. A motor 30 (e.g., a brushless DC electric motor) is supported within the motor housing portion 18, and a drive mechanism 34 is supported within the drive housing portion 22 (FIG. 2).

The illustrated expansion tool 10 includes a battery 46 (FIG. 1) configured to provide electrical power to the motor 30 (e.g., in response to depressing the actuator 26). The battery 46 is preferably a rechargeable battery pack with a plurality of lithium-based cells and is removably coupled to a battery receptacle 48 located at a base of the handle 14 (FIG. 1). In some embodiments, the battery 46 has a nominal output voltage of about 18 volts. In other embodiments, the battery 46 has a nominal output voltage of about 12 volts. In other embodiments, the battery 46 may have other nominal output voltages (e.g., 24 volts, 36 volts, 40 volts, etc.).

Figure 2:
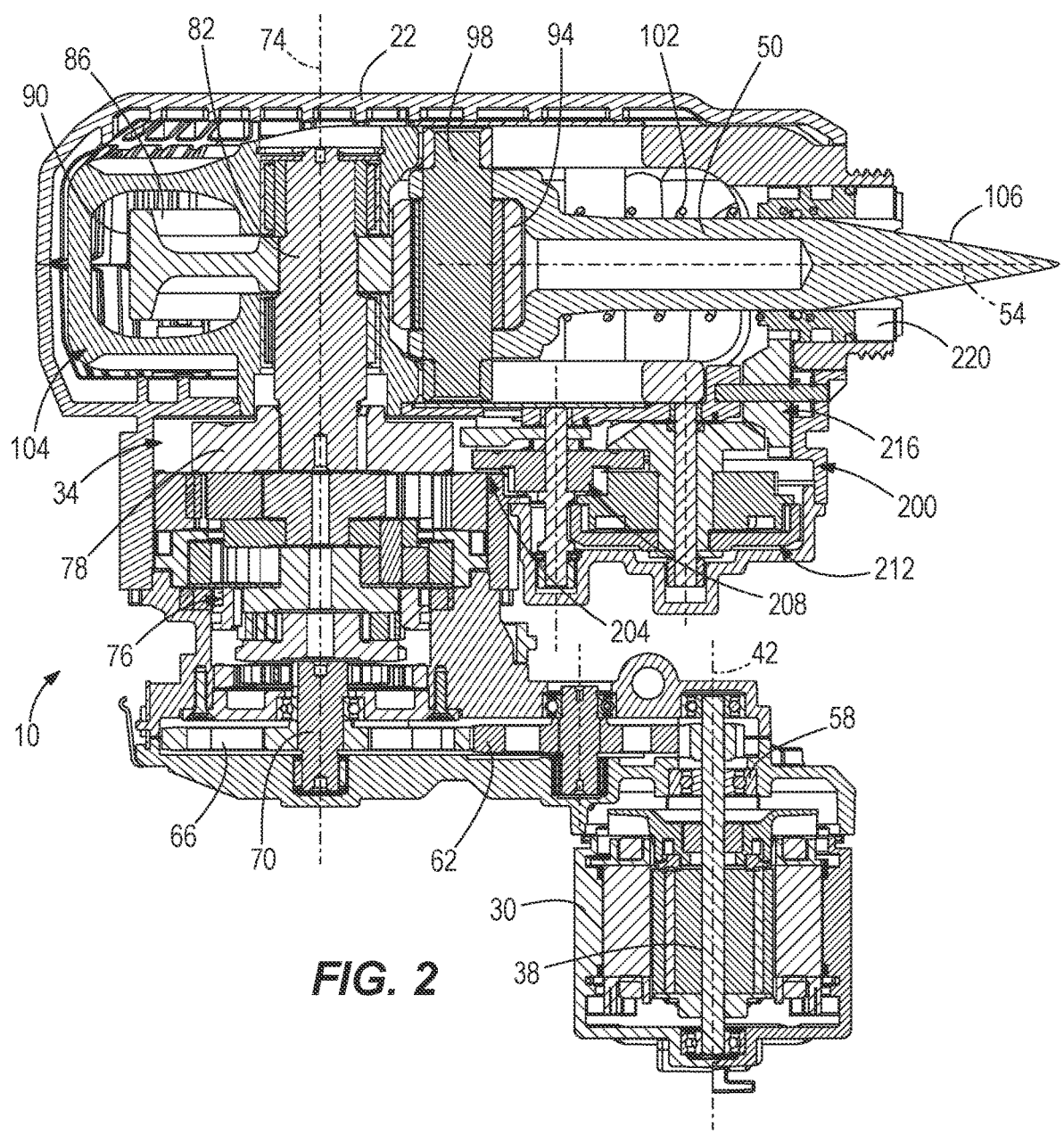
FIG. 2 is a cross-sectional view illustrating a drive assembly of the expansion tool of FIG. 1.

Referring to FIG. 2, the motor 30 includes a rotor or motor shaft 38 that rotates about a first axis or motor axis 42 to provide a rotational input to the drive mechanism 34. The drive mechanism 34 converts the rotational input from the motor shaft 38 into a translational movement of a mandrel 50 along a second axis or mandrel axis 54. In the illustrated embodiment, the mandrel axis 54 is perpendicular to the motor axis 42, which contributes to a compact overall length of the expansion tool 10.

The illustrated drive mechanism 34 includes a first gear 58 coupled for co-rotation with the motor shaft 38 about the motor axis 42, a second gear 62 meshed with the first gear 58, and a third gear 66 meshed with the second gear 62. The drive mechanism 34 provides a speed reduction and torque increase from the motor shaft 38 to the third gear 66. For example, in the illustrated embodiment, the second gear 62 is larger in diameter and includes a greater number of teeth than the first gear 58, and the third gear 66 is larger in diameter and includes a greater number of teeth than the second gear 62.

With continued reference to FIG. 2, the third gear 66 is coupled for co-rotation with a shaft 70, such that the third gear 66 and the shaft 70 co-rotate together about a third axis or drive axis 74 that is parallel to the motor axis 42 and perpendicular to the mandrel axis 54. The shaft 70 provides a rotational input to a transmission 76, which in the illustrated embodiment is a multi-stage planetary transmission (e.g., a four-stage planetary transmission). In other embodiments, other types of transmissions 76 may be used. In some embodiments, the transmission 76 is shiftable to provide the expansion tool 10 with two or more operating speeds.

The illustrated transmission 76 includes an output member 78 (i.e., a carrier of the final stage of the planetary transmission 76) coupled to a drive shaft 82 such that the drive shaft 82 co-rotates with the output member 78 about the drive axis 74. A cam 86 is coupled for co-rotation with the drive shaft 82. The cam 86 includes a contact surface 90 at its outer periphery. The contact surface 90 engages a follower or roller 94, which in turn is coupled to the mandrel 50 via a pin 98 extending vertically through the mandrel 50. The follower 94 is biased into engagement with the contact surface 90 of the cam 86 by a spring 102 acting on the mandrel 50.

The contact surface 90 of the cam 86 has a variable radius such that rotation of the cam 86 moves the follower 94 to reciprocate the mandrel 50 along the mandrel axis 54. The cam 86, follower 94, spring 102, and mandrel 50 are supported within a frame 104, which may be similar to the frame 627 described and illustrated in U.S. Patent Application Publication No. 2020/0261959, filed as application Ser. No. 16/795,742 on Feb. 20, 2020, in the name of Milwaukee Electric Tool Corporation, the entire content of which is incorporated herein by reference.

The mandrel 50 includes a conical outer surface 106 engageable with a working element 110 (FIG. 1). In the illustrated embodiment, the working element 110 includes a plurality of jaws 114. The conical outer surface 106 of the mandrel 50 (FIG. 2) is engageable with interior sides of the jaws 114 as the mandrel 50 moves from a retracted position to an extended position along the mandrel axis 54. This expands the jaws 114 radially outward from a closed position (illustrated in FIG. 1) to an expanded position. The jaws 114 may be biased toward the closed position (e.g., by an O-ring or toroidal spring surrounding the jaws 114, by tension springs interconnecting adjacent jaws 114, or by any other suitable arrangement), such that the jaws 114 return to the closed position when the mandrel 50 retracts along the mandrel axis 54.

Referring to FIG. 1, each of the jaws 114 has an exterior side with a tapered portion 118 and a sizing portion 122. When the working element 110 is in the closed position, adjacent jaws 114 abut one another such that the tapered portions 118 define a generally frustoconical shape. The sizing portions 122 collectively define a constant diameter or maximum cross-sectional dimension when the jaws 114 are in the closed position, with the diameter being sized for proper expansion of PEX tubing of a desired nominal size. In other embodiments, the jaws 114 may be formed with other linear and/or non-linear profiles along the length of each jaw 114. In some embodiments, the working element 110 may be removably coupled to the expansion tool 10 such that the jaws 114 may be interchanged with jaws having other sizes/geometries. For example, the working element 110 may be part of an expansion tool system including a plurality of interchangeable working elements, such as the expansion tool system 905 described and illustrated in U.S. Patent Application Publication No. 2020/0261959, which, as discussed above, is incorporated by reference.

Figure 3:
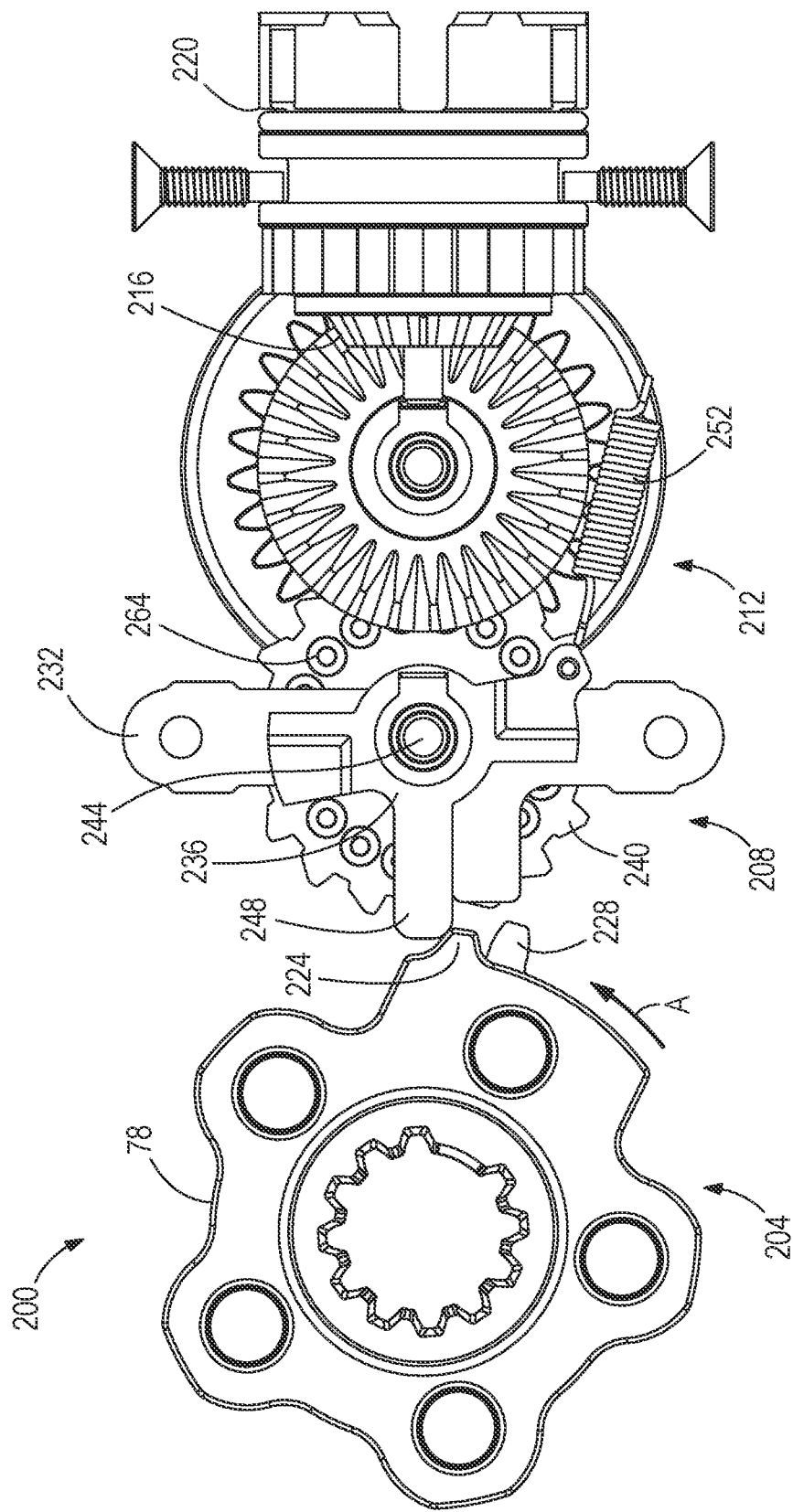
FIG. 3 is a top view of an automatic jaw rotation mechanism of the expansion tool of FIG. 1.

Referring to FIGS. 2-3, the illustrated expansion tool 10 includes an automatic jaw rotation mechanism 200 for automatically rotating the jaws 114 of the working element 110 about the mandrel axis 54 during operation of the expansion tool 10. The automatic jaw rotation mechanism 200 includes an indexing portion 204, a locking assembly 208, a clutch assembly 212, an intermediate gear assembly 216, and a rotation collar 220. The rotation collar 220 is rotatably coupled to the frame 104. The jaws 114 are coupled to the rotation collar 220 such that rotation of the collar 220 rotates the jaws 114.

With reference to FIG. 3, the indexing portion 204 includes a first projection 224 and a second projection 228 extending radially outward from the output member 78. The projections 224, 228 are integrally formed with the output member 78, such that the projections 224, 228 co-rotate with the output member 78 during operation of the expansion tool 10. In other embodiments, the projections 224, 228 may be provided on one or more separate elements coupled for co-rotation with the output member 78. The projections 224, 228 are offset from one another in a rotational direction of the output member 78. More specifically, the first projection 224 is disposed in front of the second projection 228 in the rotational direction of arrow A, which is the direction the output member 78 rotates during operation of the expansion tool 10.

With continued reference to FIG. 3, the locking assembly 208 includes a frame element 232, an actuator 236, and an indexing gear 240. The frame element 232 is fixed relative to the drive housing portion 22 of the expansion tool 10. The actuator 236 and the indexing gear 240 are each rotatable relative to the frame element 232 about a pin 244 supported by the frame element 232. In some embodiments, the actuator 236 and the indexing gear 240 are each rotatable relative to the pin 244, and the pin 244 is fixed. Alternatively, one of the actuator 236 or the indexing gear 240 may be coupled for co-rotation with the pin 244 relative to the frame element 232, and the other of the actuator 236 or the indexing gear 240 may be rotatable relative to the pin 244. In either case, the actuator 236 and the indexing gear 240 are rotatable independently of one another.

Figure 6:
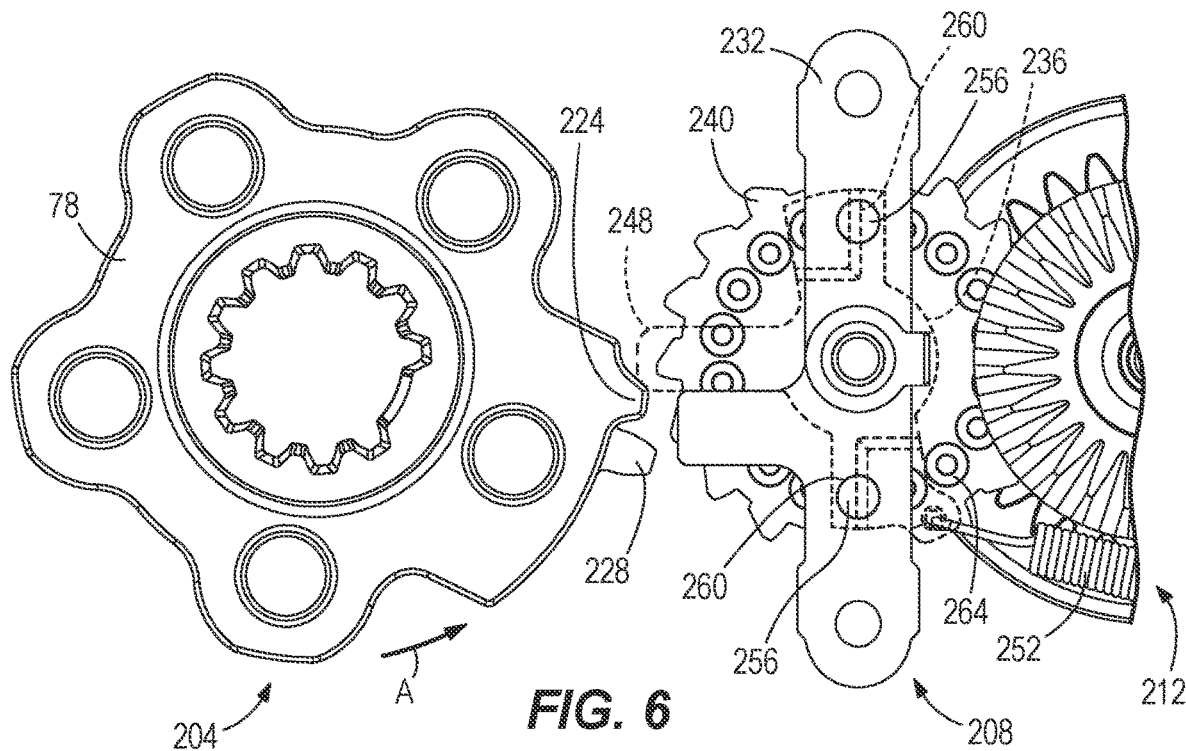
FIG. 6 is a top view illustrating a locking assembly of the automatic jaw rotation mechanism of FIG. 3 in a locked position.
Figure 7:
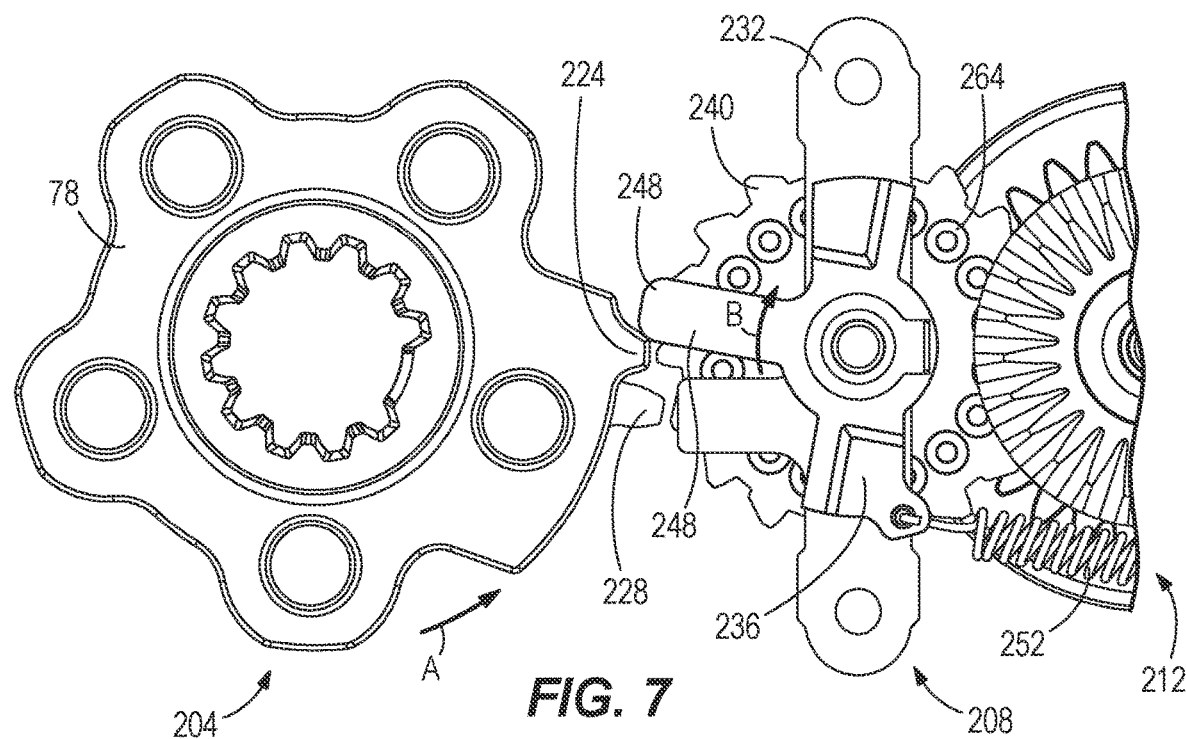
FIG. 7 is a top view illustrating the locking assembly of FIG. 6 in an unlocked position.

The actuator 236 includes a radially-extending arm 248 that extends into the path of the first projection 224. As such, the first projection 224 is engageable with the arm 248 once per revolution of the output member 78 to rotate (i.e. actuate) the actuator 236. More specifically, with reference to FIGS. 6-7, the actuator 236 is rotatable from a locked position (FIG. 6) toward an unlocked position (FIG. 7) in the direction of arrow B in response to the first projection 224 engaging the arm 248. The actuator 236 is biased toward the locked position by a spring 252 (e.g., a coil spring). In other embodiments, the actuator 236 may be biased toward the locked position by a torsion spring or any other suitable means.

Figure 8:
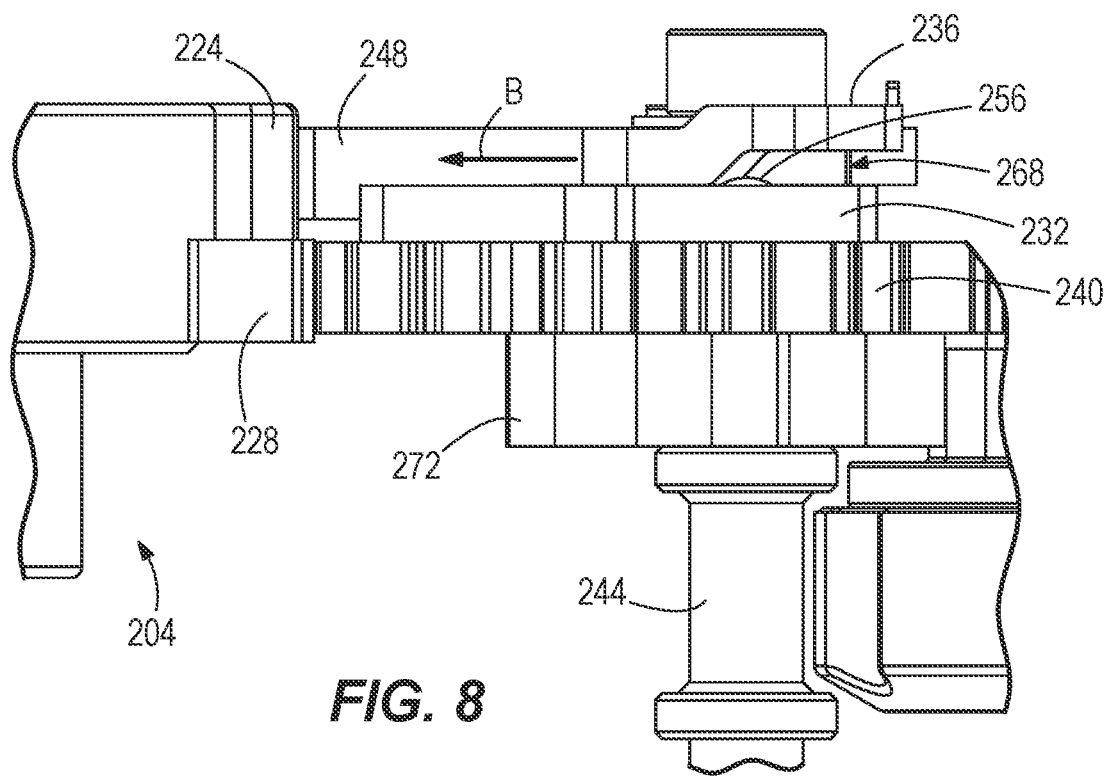
FIG. 8 is a side view illustrating the locking assembly of FIG. 6 in the unlocked position, with a detent of the locking assembly in an engaged position.

The illustrated locking assembly 208 further includes a plurality of detents 256 (FIG. 6) positioned within respective through-holes 260 in the frame element 232. The detents 256 are held within respective recesses 264 formed in an upper surface of the indexing gear 240 by the actuator 236 when the actuator 236 is in the locked position. In this engaged position of the detents 256 (e.g., FIG. 8), the detents 256 lock the indexing gear 240 to the frame 232 and thereby prevent rotation of the indexing gear 240. When the actuator 236 is moved to the unlocked position (FIG. 9), recesses 268 located on the underside of the actuator 236 move into alignment with the detents 256 and the through-holes 260, allowing the detents 256 to move upward toward a displaced position (i.e. in the direction of arrow C) and out of the recesses 264 in the indexing gear 240. Thus, the indexing gear 240 is permitted to rotate.

Figure 10:
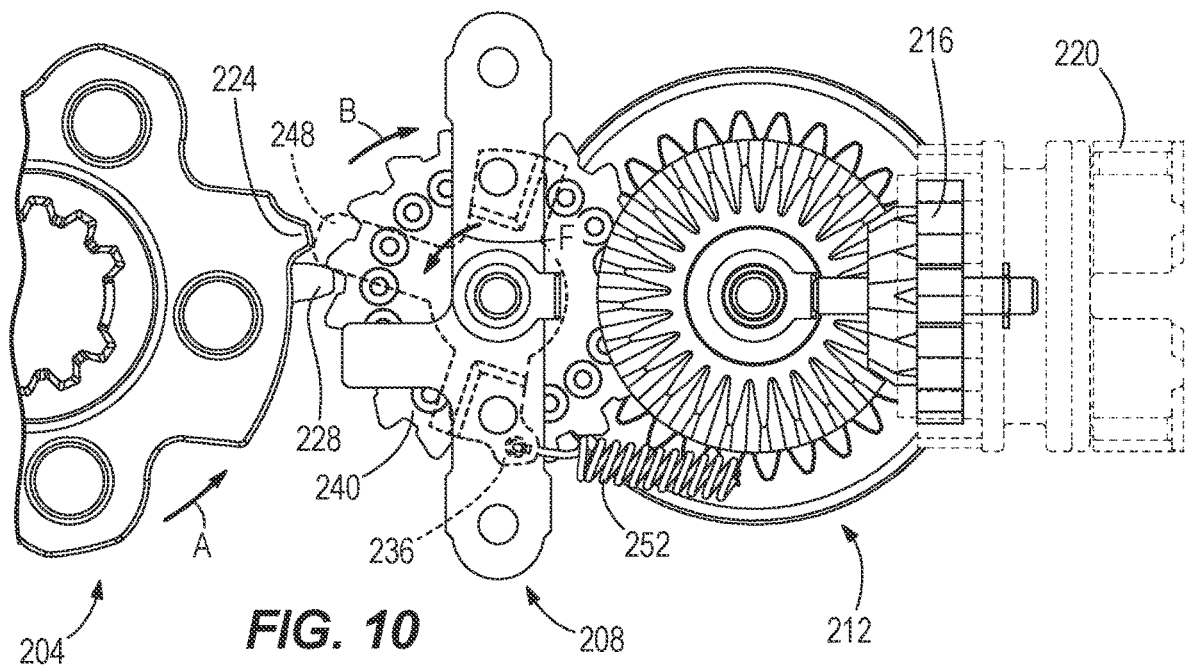
FIG. 10 is a top view illustrating movement of the locking assembly of FIG. 6 from the unlocked position toward the locked position.

Referring to FIG. 10, the second projection 228 of the indexing portion 204 is engageable with teeth on the indexing gear 240 once per revolution of the output member 78 to rotate the indexing gear 240. More specifically, the indexing gear 240 is rotatable in the direction of arrow B in FIG. 10 in response to the second projection 228 engaging the indexing gear 240. The first and second projections 224, 228 are positioned and sized such that the locking assembly is moved to the unlocked position prior to the second projection 228 engaging the indexing gear 240. As such, the indexing gear 240 is unlocked and able to rotate when contacted by the second projection 228.

Figure 4:
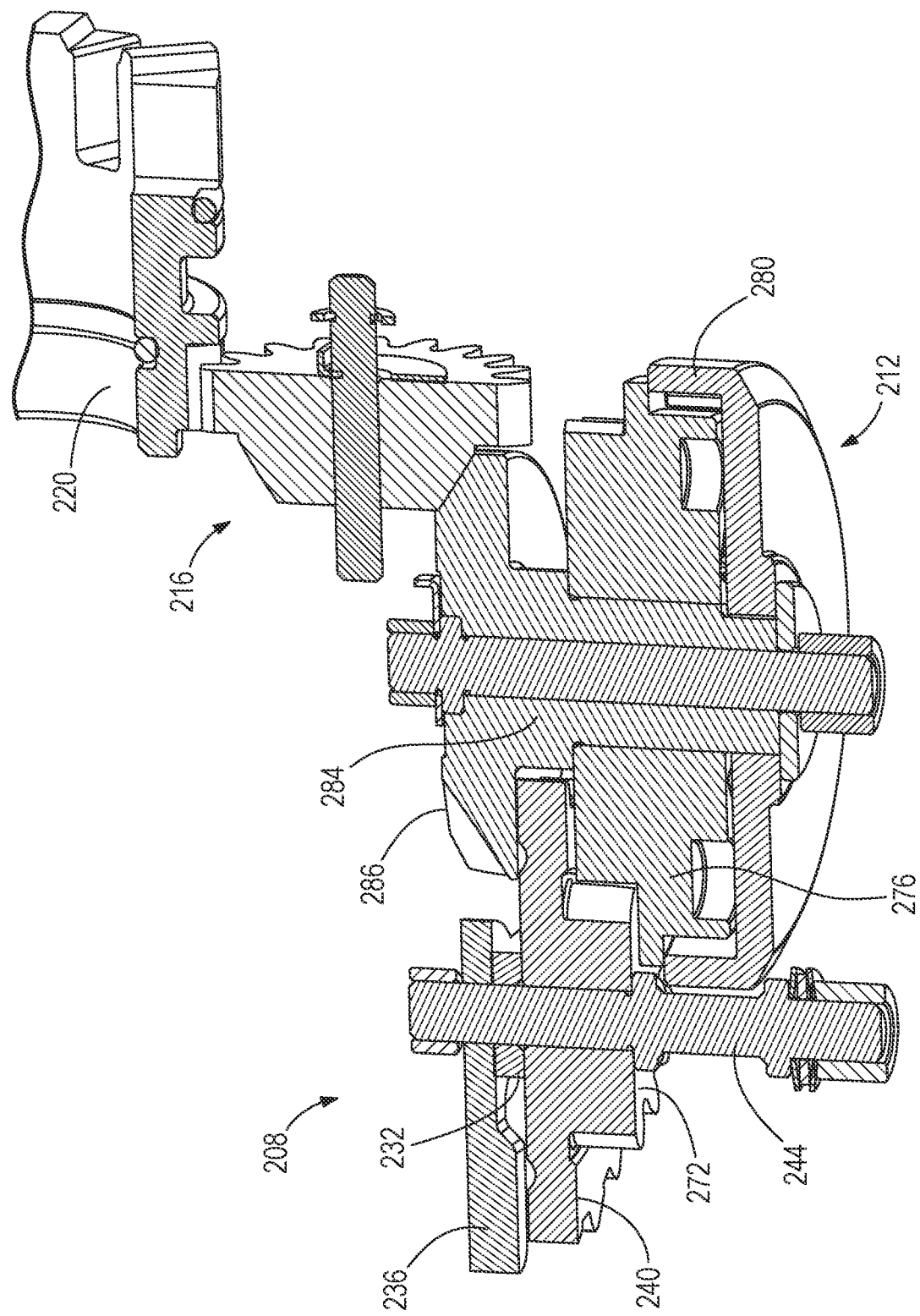
FIG. 4 is a cross-sectional view of the automatic jaw rotation mechanism of FIG. 3.

With reference to FIG. 4, the indexing gear 240 includes a spur gear 272 on the underside of the indexing gear 240. In some embodiments, the spur gear 272 may be integrally formed with the index gear 240. The spur gear 272 is meshed with a clutch gear 276 of the clutch assembly 212 to provide a rotational input to the clutch assembly 212. The clutch assembly 212 also includes a clutch cover 280 and a clutch shaft 284 coupled for co-rotation with the clutch cover 280 (e.g., via a double-D connection, a spline connection, or any other suitable connection). The clutch shaft 284 extends through the clutch gear 276 and is rotatable relative to the clutch gear 276. The clutch shaft 284 also includes a bevel gear 286, which may be an integral part of the clutch shaft 284 in some embodiments, and which acts as an output of the clutch assembly 212 to drive the intermediate gear assembly 216. The intermediate gear assembly 216 in turn drives the rotation collar 220 to rotate the jaws 114.

The clutch assembly 212 allows the clutch gear 276 to rotate (i.e. "slip") relative to the clutch cover 280 and clutch shaft 284, thereby providing a torque-limiting function between the indexing gear 240 and the jaws 114 (and, more specifically, between the spur gear 272 and the intermediate gear assembly 216). The clutch assembly 212 therefore protects the automatic rotation mechanism 200 from damage in the event the jaws 114 become jammed, etc.

Referring to FIGS. 5 and 5A, the illustrated clutch assembly 212 includes a plurality of rolling elements 288 and a corresponding plurality of clutch springs 292 configured to bias the rolling elements 288 radially outward and into engagement with a cam profile 296 formed on the inner periphery of the clutch cover 280. Each rolling element 288 and clutch spring 292 is accommodated within a respective slot 300 in the clutch gear 276, such that the rolling elements 288 and the clutch springs 292 co-rotate with the clutch gear 276. The cam profile 296 includes a plurality of troughs 304, each having a first ramp surface 308 and a second ramp surface 312 opposite the first ramp surface 308.

When the clutch gear 276 is rotated in the direction of arrow D in FIG. 5 (in response to a rotational input from the indexing gear 240), the rolling elements 288 wedge against the first ramp surfaces 308 and provide a torque-transferring connection between the clutch gear 276 and the clutch cover 280. The clutch cover 280 may thus rotate with the clutch gear 276, which in turn rotates the clutch shaft 284 to drive the intermediate gear assembly 216 and the rotation collar 220. If the jaws 114 become jammed or otherwise encounter sufficient resistance, the rolling elements 288 will travel up the first ramp surfaces 308 and compress the clutch springs inward. Once the rolling elements 288 clear the ends of the first ramp surfaces 308, the clutch gear 276 is allowed to rotate relative to the clutch cover 280 until the rolling elements 288 are pressed by the clutch springs 292 into an adjacent trough 304.

If torque is applied directly to the jaws 114, the clutch cover 280 may be rotated in the direction of arrow D relative to the clutch gear 276. In this case, the second ramp surfaces 312 bear against the rolling elements 288 and compress the clutch springs 292. When the rolling elements 288 clear the ends of the second ramp surfaces 312, clutch cover 280 is allowed to rotate relative to the clutch gear 276 until the rolling elements 288 are pressed by the clutch springs 292 into an adjacent trough 304. In the illustrated embodiment, the second ramp surfaces 312 have a more gradual (i.e. shallower) slope than the first ramp surfaces 308. This provides the clutch assembly 212 with a higher torque limiting threshold when the automatic rotation mechanism 200 drives the jaws 114 than when the jaws 114 are back-driven, for example.

In operation, the jaws 114 (FIG. 1) of the expansion tool 10 are inserted into an end of a segment of PEX tubing to be expanded such that the tapered portions 118 abut an interior wall of the PEX tubing. The operator depresses the actuator 26, which energizes the motor 30. The motor 30 rotates the cam 86 via the drive mechanism 34 to perform cycles of axially extending and retracting the mandrel 50 along the mandrel axis 54 (FIG. 2), thereby expanding and contracting the jaws 114. As the jaws 114 expand, the tapered portions 118 engage with the interior wall of the PEX tubing to gradually expand the PEX tubing. The expansion tool 10 continues the cycles of axially extending and retracting the mandrel 50. The operator pushes the jaws 114 deeper into the PEX tubing with each successive expansion until the sizing portions 122 of the jaws 114 are fully inserted into the PEX tubing. This indicates to the operator that expansion is complete. The jaws 114 are withdrawn from the PEX tubing, and the operator inserts a fitting into the end of the PEX tubing. The interior of the PEX tubing then elastically recovers and secures the fitting in place.

The automatic rotation mechanism 200 operates to incrementally rotate the jaws 114 during each cycle of axially extending and retracting the mandrel 50. In the illustrated embodiment, the automatic rotation mechanism 200 rotates the jaws 114 during the retraction stroke of the mandrel 50 (i.e. when the jaws are moving from the expanded position toward the retracted position). More specifically, with reference to FIG. 6, the output member 78 continuously rotates in the direction of arrow A during operation of the expansion tool 10. When the mandrel 50 reaches the extended position and begins to retract, the first projection 224 comes into contact with the arm 248 of the actuator 236. This causes the actuator 236 to rotate from its locked position, illustrated in FIG. 6, to its unlocked position, illustrated in FIG. 7, in the direction of arrow B.

Figure 9:
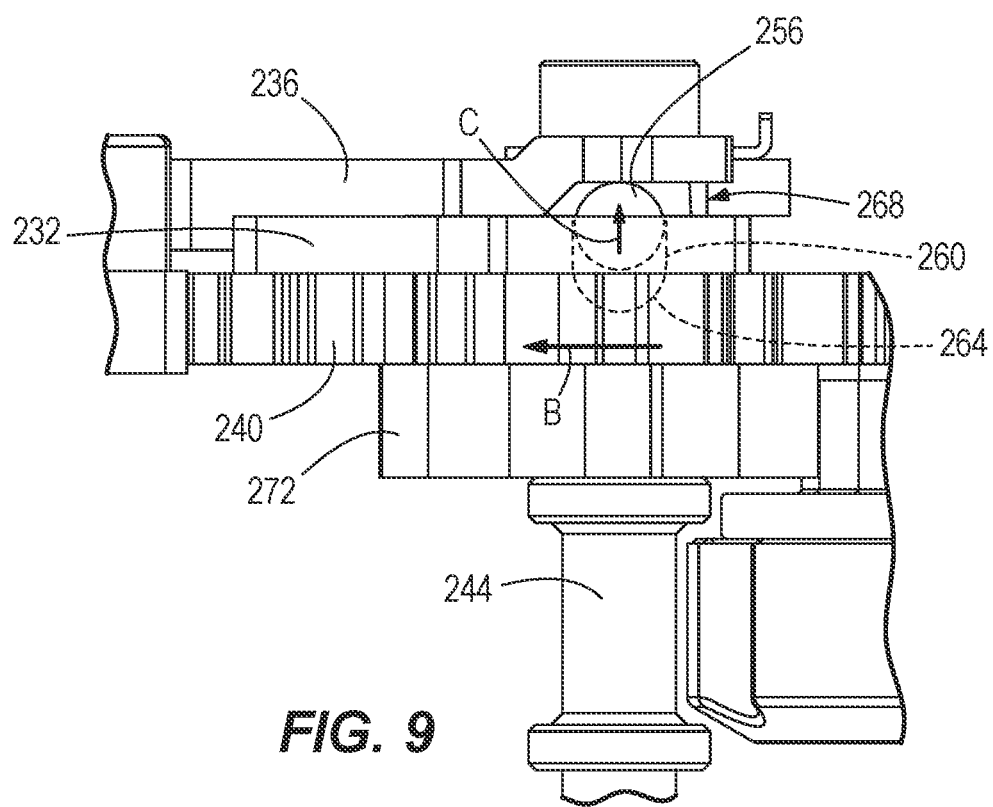
FIG. 9 is a side view illustrating the locking assembly of FIG. 6 in the unlocked position, with the detent in a displaced position.

As the actuator 236 moves toward the unlocked position in the direction of arrow B, the recesses 268 in the underside of the actuator 236 align with the through-holes 260 in the frame 232 (FIG. 9). As the drive member 78 continues rotating, the second projection 228 comes into contact with the indexing gear 240. The indexing gear 240 begins to rotate in the direction of arrow B, which pushes the detents 256 upward (in the direction of arrow C) into the recesses 268 of the actuator 236 and out of the recesses 264 of the indexing gear 240.

Figure 11:
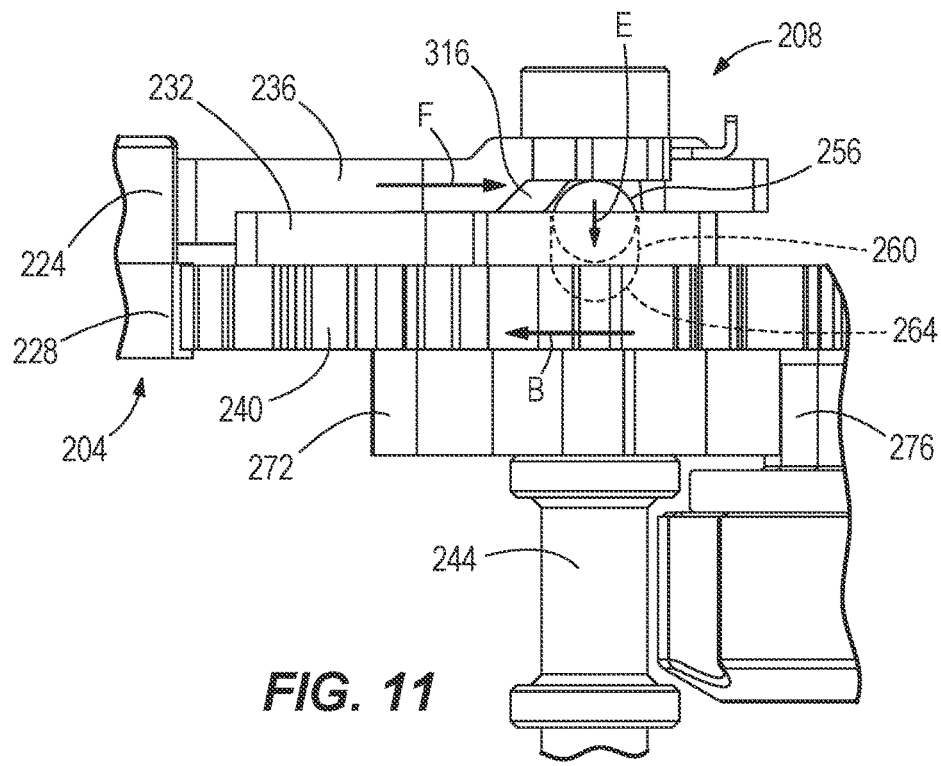
FIG. 11 is a side view illustrating movement of the locking assembly of FIG. 6 from the unlocked position toward the locked position and corresponding movement of the detent from the displaced position toward the engaged position.

Referring to FIG. 10, as the index gear 240 continues to rotate in the direction of arrow B due to its engagement with the second projection 228, the first projection 224 clears the end of the arm 248. The spring 252 then begins rotating the actuator 236 toward its locked position, in the direction of arrow F. As the actuator 236 rotates under the influence of the spring 252, angled surfaces 316 on the underside of the actuator 236 engage the detents 256 and push the detents 256 downward, in the direction of arrow E (FIG. 11).

As the drive member 78 continues rotating, the second projection 228 disengages from the indexing gear 240, the next recesses 264 in the top surface of the indexing gear 240 come into alignment with the through-holes 260 and detents 256. The actuator 236 completes its rotation to the locked position in the direction of arrow F, which seats the detents 256 into the recesses 264 in the indexing gear 240. The indexing gear 240 is thereby locked against continued rotation.

The locking mechanism 208 thus acts to provide a consistent rotational displacement of the indexing gear 240 for each revolution of the drive member 78. In some embodiments, the rotational displacement of the indexing gear 240 may be between 10 degrees and 20 degrees for each rotation of the drive member 78. In some embodiments, the rotational displacement of the indexing gear 240 is 15 degrees for each rotation of the drive member.

When the indexing gear 240 rotates in the direction of arrow B via contact with the second projection 228, the indexing gear 240 provides a rotational input to the clutch gear 276 via the spur gear 272 (FIG. 4). The clutch assembly 212 transmits torque as described above, up to a predetermined torque threshold, to the intermediate gear assembly 216, which in turn rotates the rotation collar 220 and the jaws 114.

The jaws 114 are preferably incrementally rotated during each retraction cycle by an angular displacement that is less than the angular spacing of the jaws 114. For example, when the working element 110 includes six jaws, the jaws are spaced by sixty degrees, and the automatic rotation mechanism 200 is operable to rotate the jaws 114 by an angular displacement less than sixty degrees during each retraction cycle. In some embodiments, the jaws 114 are rotated by an angular displacement less than 45 degrees, and in some embodiments, the jaws 114 are rotated by an angular displacement less than 20 degrees.

By rotating the jaws 114 by an angular displacement that is less than the angular spacing of the jaws 114, the jaws 114 smooth out any indentations that may be formed on the interior wall of the PEX tubing during expansion. This promotes a quality seal with the subsequently inserted fitting. Furthermore, by rotating the jaws 114 while the jaws 114 are retracting, friction between the jaws 114 and the PEX tubing is reduced. In addition, rotating the jaws 114 simultaneously while the jaws 114 are retracting advantageously reduces the cycle time of the expansion tool 10.

Referring to FIG. 2, the components of the indexing assembly 204, the locking assembly 208, and the clutch assembly 212 are each rotatable about respective axes that are parallel to the motor axis 42 and perpendicular to the mandrel axis 54. This arrangement advantageously provides the automatic rotation mechanism 200 with a compact overall size. In other embodiments, however, the automatic rotation mechanism 200 may be differently arranged to provide the expansion tool 10 with other form factors as may be desired for certain applications.

Various features and aspects of the present invention are set forth in the claims.

What is claimed is:

1. An expansion tool comprising:
a housing;
a collar rotatably coupled to the housing;
a plurality of jaws coupled for co-rotation with the collar;
a mandrel movable relative to the housing between a retracted position and an extended position, the mandrel engageable with the jaws to expand the jaws in response to movement of the mandrel to the extended position;
a drive mechanism including a rotatable cam, wherein rotation of the cam moves the mandrel between the retracted position and the extended position;
an indexing gear configured to incrementally receive torque from the drive mechanism such that continuous rotation of the drive mechanism incrementally rotates the indexing gear; and
a clutch assembly including a clutch gear meshed with the indexing gear, a clutch cover surrounding the clutch gear, and a plurality of rolling elements disposed between the clutch gear and the clutch cover, wherein the rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold,
wherein the clutch cover is drivably coupled to the collar such that rotation of the clutch cover rotates the collar, and
wherein the clutch assembly further includes a clutch shaft coupled for co-rotation with the collar, the clutch shaft including a bevel gear.

2. The expansion tool of claim 1, further comprising an intermediate gear assembly disposed between the bevel gear and the collar to transmit torque from the bevel gear to the collar.

3. The expansion tool of claim 1, wherein the drive mechanism, the indexing gear, the clutch gear, and the clutch cover are rotatable about parallel axes.

4. The expansion tool of claim 1, wherein the clutch assembly includes a plurality of clutch springs configured to bias the plurality of rolling elements into engagement with the clutch cover.

5. The expansion tool of claim 1, further comprising a locking assembly configured to inhibit rotation of the indexing gear when an actuator is in a locked position and permit rotation of the indexing gear when the actuator is in an unlocked position.

6. The expansion tool of claim 1, wherein the drive mechanism includes a planetary transmission, and wherein the planetary transmission includes a carrier drivably coupled to the cam such that the cam co-rotates with the carrier.

7. The expansion tool of claim 6, wherein the carrier includes a projection engageable with the indexing gear to incrementally rotate the indexing gear.

8. An expansion tool comprising:
a housing;
a collar rotatably coupled to the housing;
a plurality of jaws coupled for co-rotation with the collar;
a mandrel movable relative to the housing between a retracted position and an extended position, the mandrel engageable with the jaws to expand the jaws in response to movement of the mandrel to the extended position;
a drive mechanism including a rotatable cam and a planetary transmission including a carrier drivably coupled to the cam such that the cam co-rotates with the carrier, wherein the carrier includes a first projection and a second projection, and wherein rotation of the cam moves the mandrel between the retracted position and the extended position;
a locking assembly including an actuator engageable with the first projection such that the first projection is configured to move the actuator from a locked position to an unlocked position once per revolution of the carrier;

an indexing gear engageable with the second projection such that the second projection is configured to incrementally rotate the indexing gear once per revolution of the carrier, wherein the indexing gear is drivably coupled to the collar such that rotation of the indexing gear rotates the collar, wherein the locking assembly inhibits rotation of the indexing gear when the actuator is in the locked position, and wherein the locking assembly permits rotation of the indexing gear when the actuator is in the unlocked position.

9. The expansion tool of claim 8, wherein the first projection is configured to engage the actuator to move the actuator from the locked position toward the unlocked position prior to the second projection engaging the indexing gear.

10. The expansion tool of claim 8, further comprising a clutch assembly disposed between the indexing gear and the collar.

11. The expansion tool of claim 10, wherein the clutch assembly includes a clutch gear meshed with the indexing gear, a clutch cover surrounding the clutch gear, and a plurality of rolling elements disposed between the clutch gear and the clutch cover.

12. The expansion tool of claim 11, wherein the rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold.

13. The expansion tool of claim 12, wherein the clutch cover is drivably coupled to the collar such that rotation of the clutch cover rotates the collar.

14. An expansion tool comprising:
a housing;
a collar rotatably coupled to the housing;
a plurality of jaws coupled for co-rotation with the collar;
a mandrel movable relative to the housing between a retracted position and an extended position, the mandrel engageable with the jaws to expand the jaws in response to movement of the mandrel to the extended position;

a drive mechanism operable to move the mandrel between the retracted position and the extended position, the drive mechanism including a rotatable output member;

a locking assembly including an actuator configured to move from a locked position to an unlocked position once per revolution of the output member; and an indexing gear configured to incrementally rotate once per revolution of the output member, wherein the indexing gear is drivably coupled to the collar such that rotation of the indexing gear rotates the collar, wherein the locking assembly inhibits rotation of the indexing gear when the actuator is in the locked position, and wherein the locking assembly permits rotation of the indexing gear when the actuator is in the unlocked position.

15. The expansion tool of claim 14, further comprising an electric motor configured to provide a rotational input to the drive mechanism.

16. The expansion tool of claim 15, further comprising a battery removably coupled to the housing, the battery configured to provide power to the electric motor.

17. The expansion tool of claim 14, further comprising a clutch assembly disposed between the indexing gear and the collar.

18. The expansion tool of claim 17, wherein the clutch assembly includes a clutch gear meshed with the indexing gear, a clutch cover surrounding the clutch gear, and a plurality of rolling elements disposed between the clutch gear and the clutch cover.

19. The expansion tool of claim 18, wherein the rolling elements are configured to establish a torque-transferring connection between the clutch gear and the clutch cover up to a predetermined torque threshold and to slip relative to the clutch cover to permit the clutch gear to rotate relative to the clutch cover at torques greater than the predetermined torque threshold.

20. The expansion tool of claim 19, wherein the clutch cover is drivably coupled to the collar such that rotation of the clutch cover rotates the collar.

* * * * *